(12) United States Patent
Lee

(10) Patent No.: US 7,493,484 B2
(45) Date of Patent: Feb. 17, 2009

(54) METHOD AND APPARATUS FOR EXECUTING THE BOOT CODE OF EMBEDDED SYSTEMS

(75) Inventor: Byeong-Hoon Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 311 days.

(21) Appl. No.: 11/050,477

(22) Filed: Feb. 3, 2005

(65) Prior Publication Data

US 2006/0005005 A1 Jan. 5, 2006

(30) Foreign Application Priority Data

Jul. 3, 2004 (KR) .................. 10-2004-0051801

(51) Int. Cl.
  G06F 9/00 (2006.01)
  G06F 11/00 (2006.01)
(52) U.S. Cl. .................. 713/2; 713/1; 714/36
(58) Field of Classification Search .......... 713/2, 713/200
  See application file for complete search history.

(56) References Cited

U.S. PATENT DOCUMENTS

| | | | |
|---|---|---|---|
| 5,388,267 A | | 2/1995 | Chan et al. |
| 5,634,079 A | | 5/1997 | Buxton |
| 5,805,882 A | * | 9/1998 | Cooper et al. .................. 713/2 |
| 5,822,243 A | * | 10/1998 | Shone .................. 365/185.08 |
| 5,987,605 A | * | 11/1999 | Hill et al. .................. 713/2 |
| 6,125,054 A | * | 9/2000 | Yusa et al. ............. 365/185.04 |
| 6,182,187 B1 | * | 1/2001 | Cox et al. .................. 711/5 |
| 6,601,167 B1 | * | 7/2003 | Gibson et al. .................. 713/2 |
| 6,687,154 B2 | * | 2/2004 | Lee et al. ................ 365/185.03 |
| 7,206,971 B2 | * | 4/2007 | Zeller et al. .................. 714/36 |
| 2004/0078679 A1 | * | 4/2004 | Cagle et al. .................. 714/36 |
| 2004/0128425 A1 | * | 7/2004 | Zitlaw et al. .................. 711/1 |
| 2004/0158702 A1 | * | 8/2004 | Tasaki .................. 713/2 |
| 2004/0199825 A1 | * | 10/2004 | Zeller et al. .................. 714/36 |

FOREIGN PATENT DOCUMENTS

| | | |
|---|---|---|
| CN | 1490817 | 4/2004 |
| EP | 1 041 486 A2 | 4/2000 |
| JP | 10-021085 | 1/1998 |
| JP | 2000-293375 | 10/2000 |
| JP | 2004-038529 | 2/2004 |

OTHER PUBLICATIONS

Office Action dated Apr. 11, 2008 for corresponding Chinese Patent Application 200510082149.X.

* cited by examiner

Primary Examiner—Suresh K Suryawanshi
(74) Attorney, Agent, or Firm—F. Chau & Associates, LLC

(57) ABSTRACT

A memory system and corresponding method for executing boot code stored therein are provided, the memory system including a mode decoder, a first memory in signal communication with the mode decoder, a second memory in signal communication with the mode decoder, and a mode generator in signal communication with the mode decoder for generating a signal indicative of selecting one of the first and second memories as the boot memory; and the method for executing boot code including initially booting the system from a first memory, programming a second memory for subsequent booting, programming a mode generator to subsequently boot the system from the second memory, and subsequently booting the system from the second memory.

34 Claims, 8 Drawing Sheets

US 7,493,484 B2

METHOD AND APPARATUS FOR EXECUTING THE BOOT CODE OF EMBEDDED SYSTEMS

BACKGROUND

The present disclosure relates to embedded systems, and more particularly, to methods and apparatus for executing the boot code of embedded systems.

An embedded system is generally manufactured for a specified purpose. Such a system typically includes a central processing unit (CPU), memory, and software including "boot code". The boot code initializes the memory and CPU registers, and instructs the initial operation of the CPU.

Generally, the boot code may be written to read-only memory (ROM) when the system is manufactured, and supplied to the customer with the system. Unfortunately, if a slight change in the boot code is desired, the ROM needs to be exchanged because the ROM cannot be modified. In addition, some customers may want to use their own boot code for initializing the system, such as to resolve security issues.

Recently, the boot code has been more frequently stored in non-volatile memory (NVM), such as EEPROM and/or Flash memory, instead of ROM. Although this use of NVM may permit customers to customize the boot code, it has several inherent problems. For example, an error during Flash reprogramming, where the original boot code is intended to be overwritten with customized boot code, may cause the embedded system to become unbootable.

FIG. 1 shows a conventional apparatus for executing the boot code of an embedded system, which is indicated generally by the reference numeral 100. The apparatus 100 includes a CPU 110, an address decoder 120 connected to the CPU, and a Flash memory 130 connected to the decoder.

If a manufacturer stores the boot code and basic library functions in a Flash memory such as 130, the system is initially booted by the boot code provided by the manufacturer. After initial booting, a customer might erase all or part of the boot code and rewrite or reprogram new boot code, such as by using manufacturer-provided basic library functions. Thereafter, the system should normally be capable of booting with the new boot code. Unfortunately, during the process of erasing the old boot code, the flash memory is liable to be damaged. When this happens, the system may not operate properly or may not boot at all due to the destruction of the boot code.

SUMMARY

An exemplary memory system includes a mode decoder, a first memory in signal communication with the mode decoder, a second memory in signal communication with the mode decoder, and a mode generator in signal communication with the mode decoder for generating a signal indicative of selecting one of the first and second memories as the boot memory.

A corresponding method for executing boot code stored in the memory system includes initially booting the system from the first memory, programming the second memory for subsequent booting, programming the mode generator to subsequently boot the system from the second memory, and subsequently booting the system from the second memory.

These and other features of the present disclosure will become apparent from the following description of exemplary embodiments, which is to be read in connection with the accompanying drawings.

BRIEF DESCRIPTION OF THE DRAWINGS

The present disclosure teaches a method and apparatus for executing the boot code of embedded systems in accordance with the following exemplary figures, in which.

DETAILED DESCRIPTION OF PREFERRED EMBODIMENTS

Embodiments of the present disclosure are initially booted using the boot code stored in a first memory, such as a read-only memory (ROM), when the system is delivered to a customer. After initial booting, the customer can write the customer's specific code to a second memory, such as a Flash memory. Thereafter, the system can be booted using the customer's boot code stored in the second memory. Even if damage to the second memory destroys or erases the boot code, the system can be booted using the boot code still stored in the first memory. Exemplary embodiments provide various options for controlling the boot mode between a ROM and a Flash memory, for example.

Figure 1:
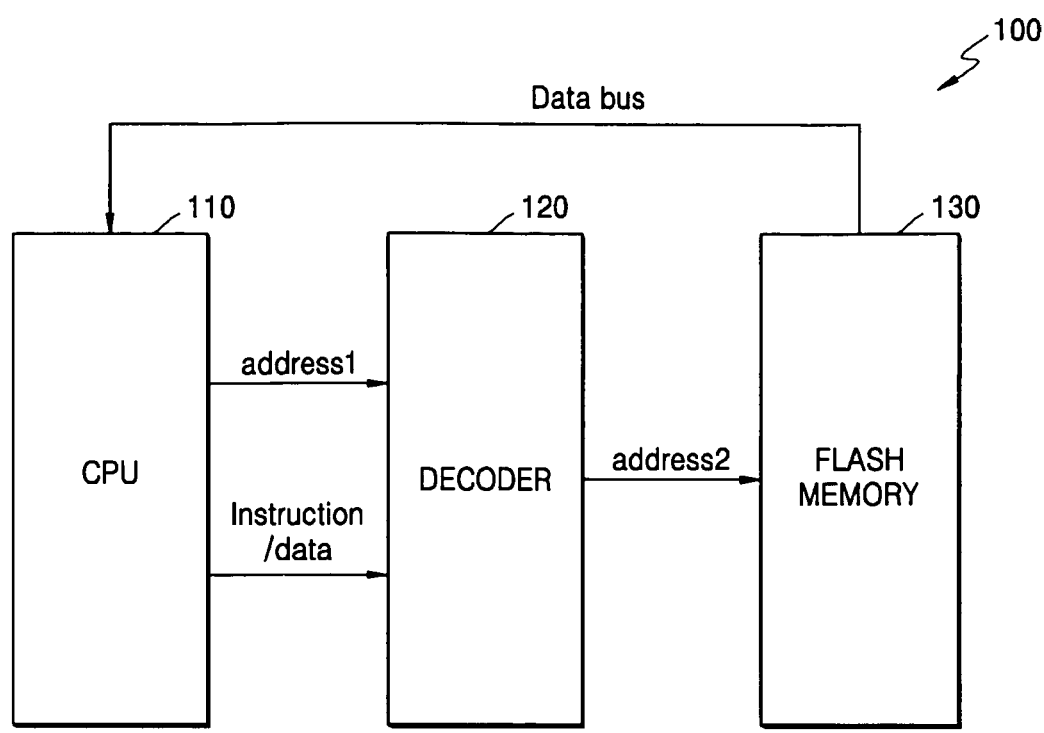
FIG. 1 is a schematic diagram showing a conventional apparatus for executing the boot code of an embedded system.
Figure 2:
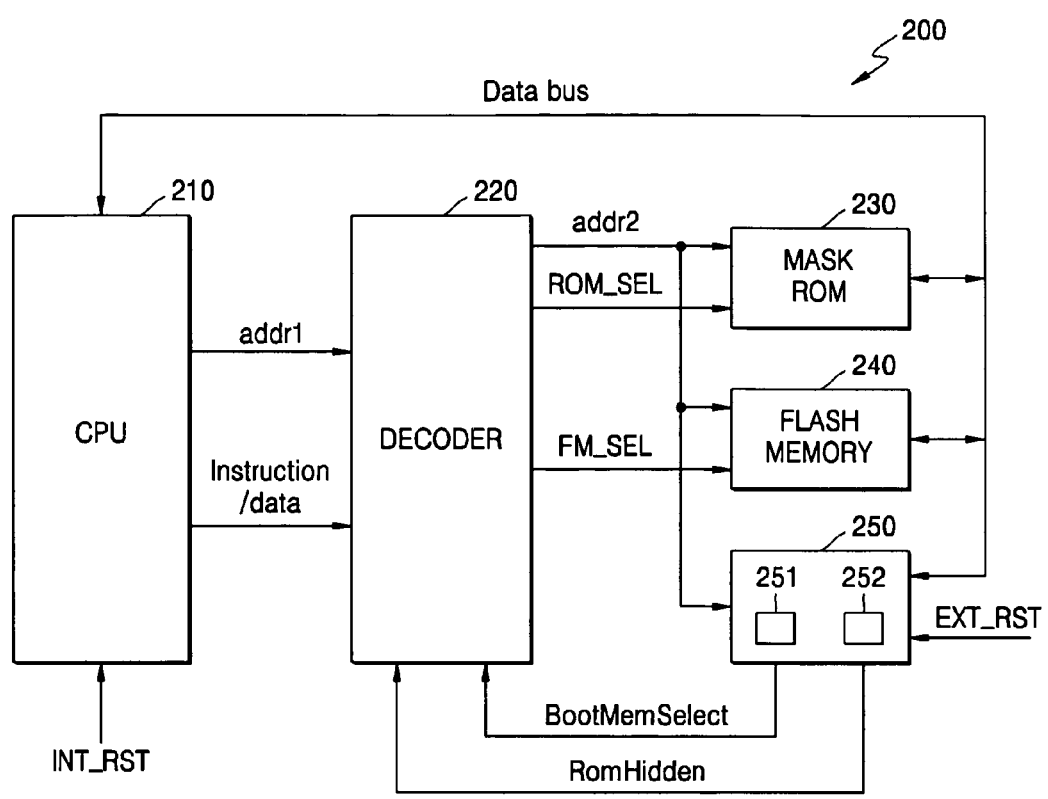
FIG. 2 is a schematic diagram showing an apparatus for executing the boot code of an embedded system in accordance with an exemplary embodiment of the present disclosure.

As shown in FIG. 2, an exemplary apparatus for executing the boot code of an embedded system is indicated generally by the reference numeral 200. The apparatus 200 includes a central processing unit (CPU) 210 for receiving an internal reset signal and issuing an address signal and a signal indicating whether the address should be treated as an instruction address or a data address, a mode decoder 220 connected to the CPU for issuing a translated address signal and a ROM selection signal or a Flash memory selection signal, a read-only memory (ROM) 230 connected to the decoder for receiving the translated address and the ROM selection signal, a Flash memory 240 connected to the decoder for receiving the translated address and the Flash memory selection signal, and a mode generator 250 connected to the decoder for receiving the translated address. The mode generator includes a first non-volatile memory (NVM) unit 251 for storing a value indicating whether the ROM or the Flash memory is selected as the boot memory, and a second NVM unit 252 for storing a value indicating whether the ROM is accessible or hidden. In an alternate embodiment, the mode generator 250 may be incorporated into the mode decoder 220.

Figure 3:
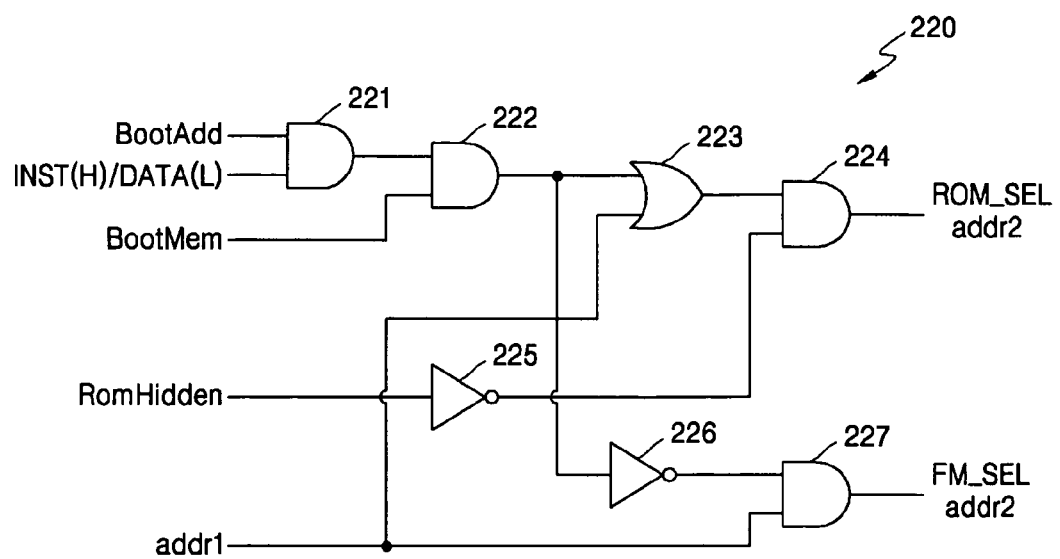
FIG. 3 is a logic diagram showing an exemplary embodiment of the mode decoder of FIG. 2.

Turning to FIG. 3, an exemplary mode decoding portion of the mode decoder of FIG. 2 is indicated generally by the reference numeral 220. Here, the mode decoder portion includes a first AND gate 221 for receiving a BootAdd signal, which indicates whether an address falls within a range of boot addresses, and an instruction/data signal, which indicates whether the address contents are to be treated as an instruction or as data. The output of the AND gate 221 is received by another AND gate 222. The AND gate 222 also receives a BootMem mode signal, which indicates whether the boot code to be used is located in the ROM or the Flash memory. An OR gate 223 receives the output from the AND gate 222, receives a signal indicative of at least one bit of the input address, and outputs to an AND gate 224. The other input to the AND gate 224 results from a RomHidden mode signal, which indicates whether access to the ROM is prevented, which is then subjected to a NOT gate 225. The output of the AND gate 224 is a ROM_SEL signal for selecting the ROM as the destination of the output address.

The signal indicative of at least one bit of the input address is also received at an AND gate 227. The output of the AND gate 222 is received by a NOT gate 226, which passes it to the other input of the AND gate 227. The output of the AND gate 227 is a FM_SEL signal for selecting the Flash memory as the destination of the output address.

Thus, for fetching boot instructions, the ROM selection signal is enabled for booting when the mode generator indicates that the ROM is not hidden and that the ROM is the Boot Memory, while the Flash memory signal is enabled for booting when the mode generator indicates that the ROM is hidden or that the Flash memory is the Boot Memory. In addition, address translation from addr1 to addr2 makes only one of the ROM or Flash memory correspond to the locations of the Boot Address pointer and Vectored Exception pointers. The Boot Memory, whether ROM or Flash memory, includes the Boot Address pointer and Vectored Exception pointers. For fetching non-boot instructions and for accessing data, the Flash memory is enabled while the ROM is only enabled if it is not hidden.

Figure 4:
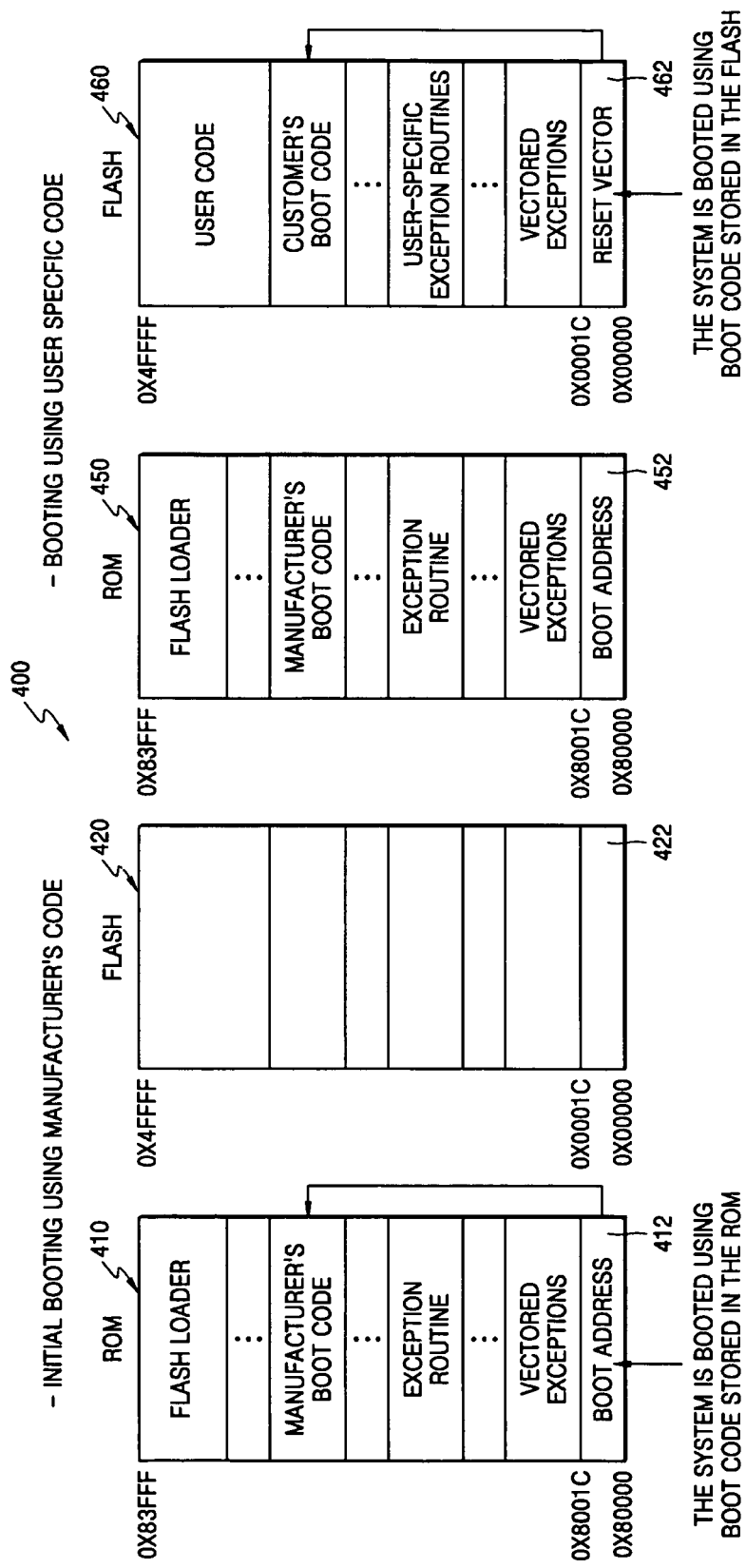
FIG. 4 is a memory map diagram showing the memory layout of the ROM and Flash memories of FIG. 2 under particular conditions.

Turning now to FIG. 4, memory maps for the apparatus 200 of FIG. 2 are indicated generally by the reference numeral 400. A ROM map 410 includes a ROM boot address pointer 412, while a Flash map 420 includes an uninitialized boot address pointer 422. Thus, during an initial booting using the manufacturer's code, the system is booted using the boot code stored in the ROM map 410.

Another ROM map 450 includes a ROM boot address 452, while another Flash map 460 includes an initialized boot address 462. Thus, during booting using user specific code, the system is booted using the boot code stored in the Flash map 460.

Figure 5:
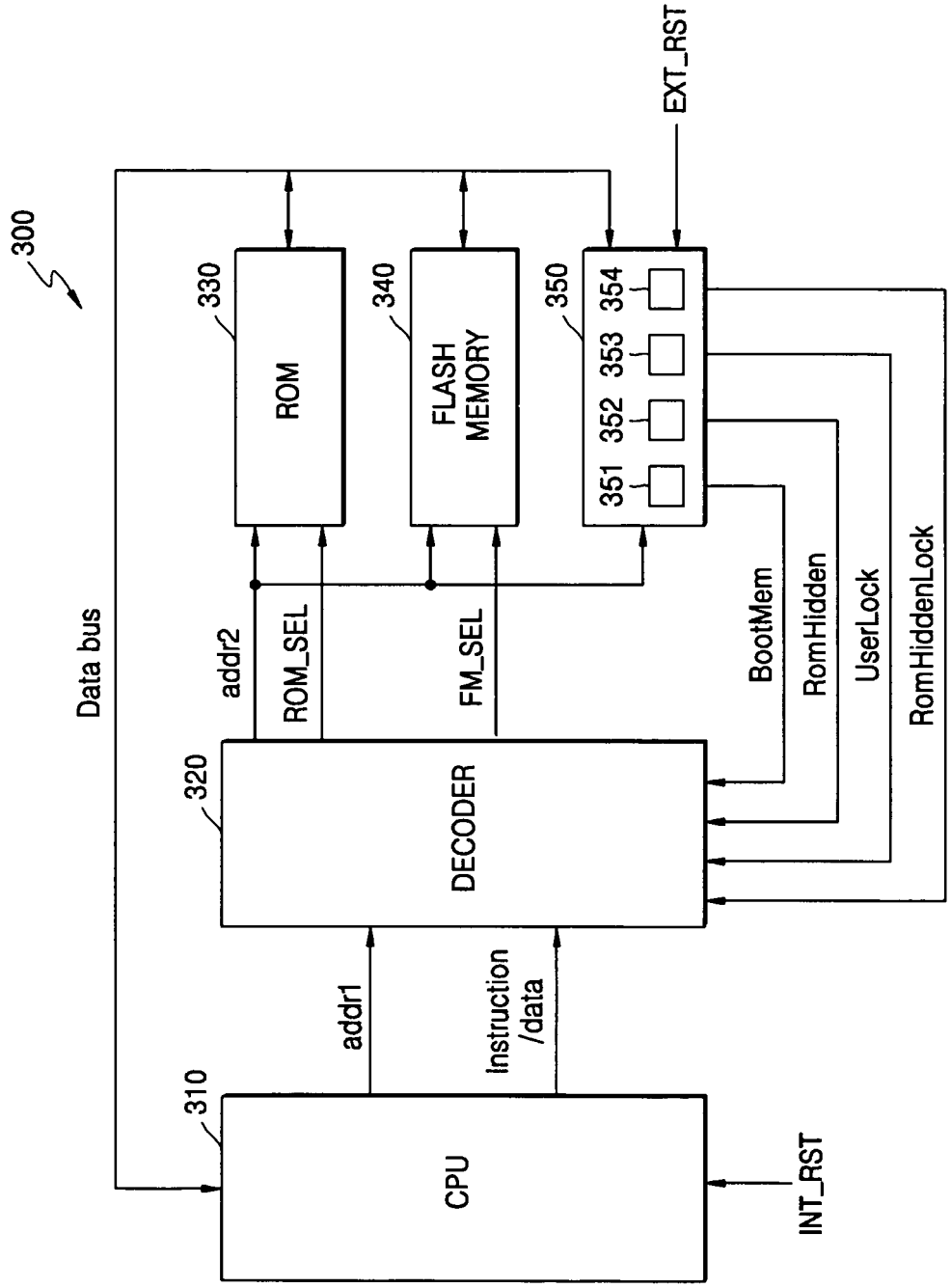
FIG. 5 is a schematic diagram showing an apparatus for executing the boot code of an embedded system in accordance with another exemplary embodiment of the present disclosure.

As shown in FIG. 5, another exemplary apparatus for executing the boot code of an embedded system is indicated generally by the reference numeral 300. The apparatus 300 includes a CPU 310, an mode decoder 320 connected to the CPU, a ROM 330 connected to the decoder, a Flash memory 340 connected to the decoder, and a mode generator 350 connected to the encoder. The mode generator includes a first NVM unit 351, a second NVM unit 352, a third NVM unit 353 and a fourth NVM unit 354.

Figure 6:
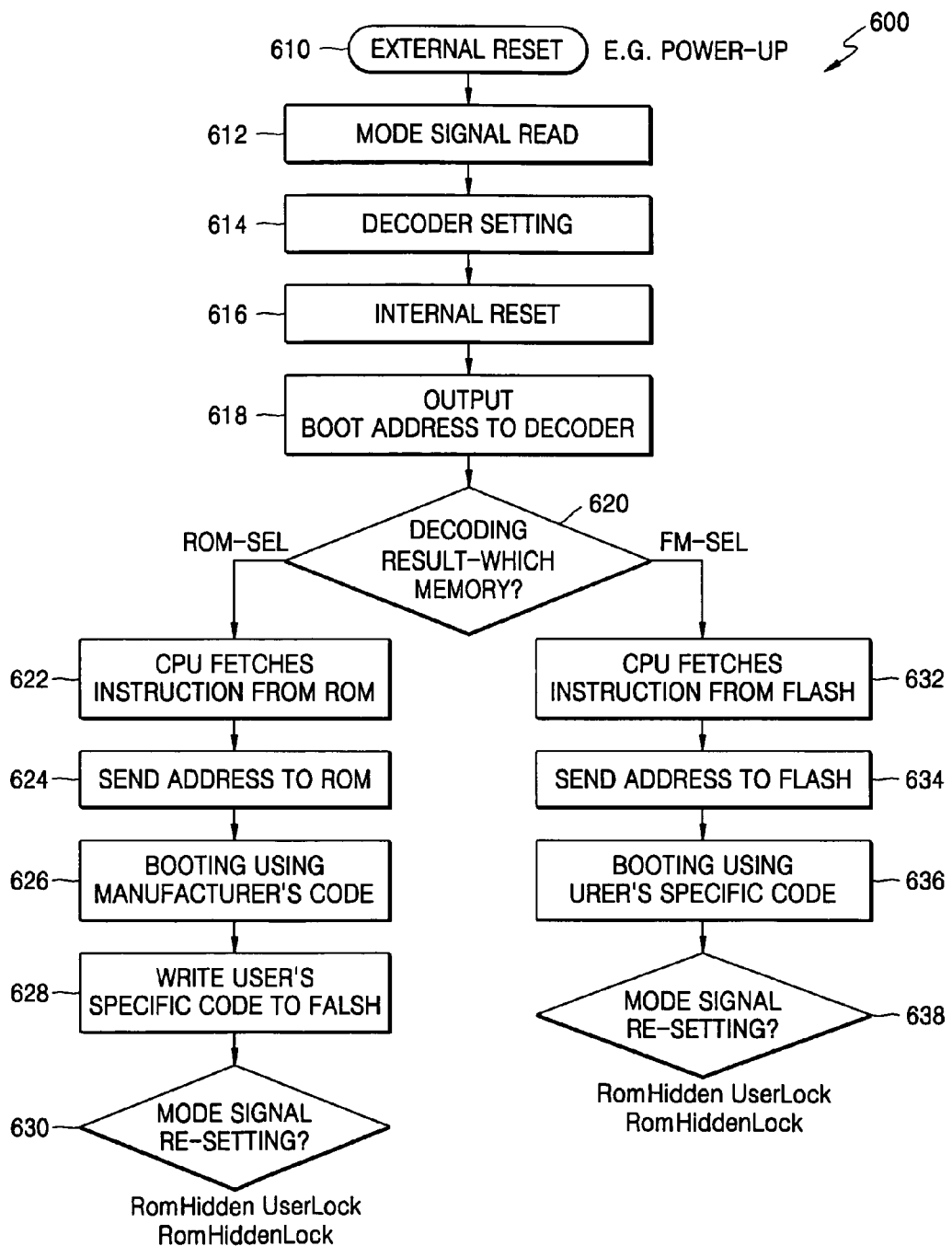
FIG. 6 is a flowchart diagram showing a method for executing the boot code of an embedded system in accordance with an exemplary embodiment of the present disclosure.

Turning to FIG. 6, a method for executing the boot code of an embedded system in accordance with an exemplary embodiment of the present disclosure is indicated generally by the reference numeral 600. The method 600 includes an external reset step 610, such as at power up, which passes control to a mode signal read step 612. The read 612 passes control to a decoder setting step 614, which, in turn, passes control to an internal reset step 616, such as at CPU start up. The step 616 passes control to an output step 618 to output a boot address to a decoder, and passes control to a decision step 620.

The decision step 620 determines which memory the decoding result selects, and if the ROM is selected, passes control to a fetch step 622 in which the CPU fetches an instruction from the ROM. The step 622 passes control to a step 624, which sends the address to the ROM and passes control to a step 626. The step 626 proceeds with booting using the manufacturer's code, and passes control to a write step 628. The write step 628 writes user specified code to the Flash memory, and passes control to a decision block 630. The decision block 630 checks a mode resetting signal for resetting a mode such as the RomHidden, UserLock and/or RomHiddenLock modes, for example.

If, on the other hand, the decision step 620 determines that the Flash is selected, it passes control to a fetch step 632 in which the CPU fetches an instruction from the Flash. The step 632 passes control to a step 634, which sends the address to the Flash and passes control to a step 636. The step 636 proceeds with booting using the user specified code, and passes control to a decision block 638. The decision block 638 checks a mode resetting signal for resetting a mode such as the RomHidden, UserLock and/or RomHiddenLock modes, for example.

Figure 7:
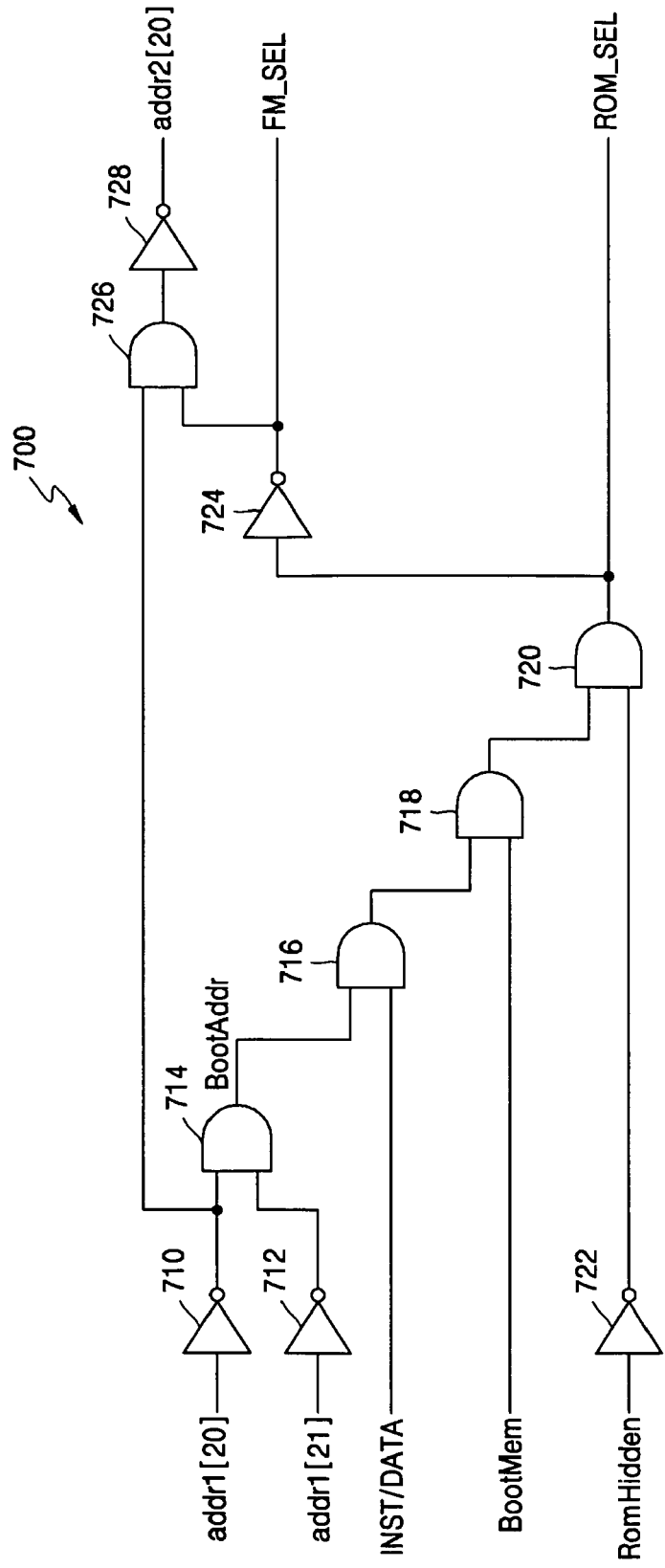
FIG. 7 is a logic diagram showing another exemplary embodiment of the mode decoder of FIG. 2.

Turning now to FIG. 7, an alternate embodiment mode decoding portion of the mode decoder of FIG. 2 in accordance with the memory maps of FIG. 4 is indicated generally by the reference numeral 700. Here, the mode decoder portion includes a NOT gate 710 for receiving the $20^{th}$ most significant bit of the CPU issued address, which corresponds to the address bit that differs between the Flash and the ROM, a NOT gate 712 for receiving the $21^{st}$ or higher most significant bit(s) of the CPU issued address, an AND gate 714 for receiving the outputs of the NOT gates 710 and 712 and outputting a signal indicating that the address is a boot memory address, an AND gate 716 for receiving the output of the AND gate 714 and the Instruction/Data signal from the CPU which is high for an instruction and low for data, an AND gate 718 for receiving the output of the AND gate 716 and the BootMem mode signal from the mode generator, and an AND gate 720 for receiving the output of the AND gate 718. A NOT gate 722 is for receiving the RomHidden mode signal from the mode generator and providing the inverted RomHidden signal as the second input to the AND gate 720. The output of the AND gate 720 provides the ROM selection signal ROM_SEL for enabling the ROM. An inverter 724 receives the ROM_SEL signal and outputs the inverted signal as the Flash memory selection signal FM_SEL for enabling the Flash Memory. An AND gate 726 receives the output of the NOT gate 724 and the output of the NOT gate 710, while a NOT gate 728 receives the output of the AND gate 726 and provides a translated address bit corresponding to the $20^{th}$ most significant bit of the memory to be used as the boot memory, which, in this case, is 1 for the ROM addresses beginning at 0x80000 or 0 for the Flash memory addresses beginning at 0x00000.

Thus, for fetching boot instructions, the ROM selection signal is enabled for booting when the mode generator indicates that the ROM is not hidden and that the ROM is the Boot Memory, while the Flash memory signal is enabled for booting when the mode generator indicates that the ROM is hidden or that the Flash memory is the Boot Memory. In addition, address translation from the $20^{th}$ bit of the CPU issued address addr1 to the $20^{th}$ bit of the boot memory address addr2 makes only one of the ROM or Flash memory correspond to the locations of the Boot Address pointer and Vectored Exception pointers. The Boot Memory, whether ROM or Flash memory, includes the Boot Address pointer and Vectored Exception pointers. For fetching non-boot instructions and for accessing data, the Flash memory is enabled while the ROM is only enabled if it is not hidden.

Figure 8:
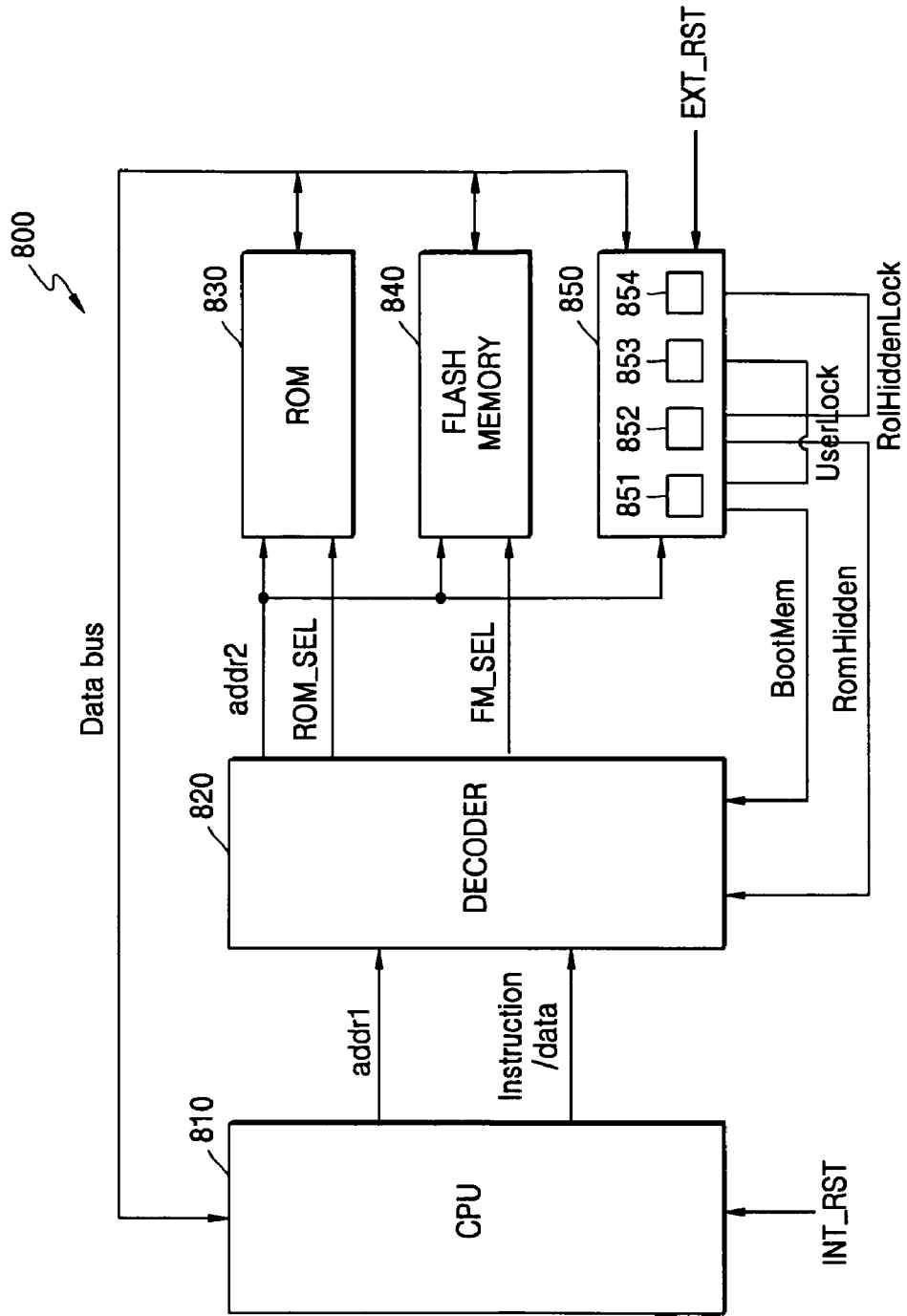
FIG. 8 is a schematic diagram showing an apparatus for executing the boot code of an embedded system in accordance with another exemplary embodiment of the present disclosure.

As shown in FIG. 8, another exemplary apparatus for executing the boot code of an embedded system is indicated generally by the reference numeral 800. The apparatus 800 includes a CPU 810, an mode decoder 820 connected to the CPU, a ROM 830 connected to the decoder, a Flash memory 840 connected to the decoder, and a mode generator 850 connected to the encoder. The mode generator includes a first NVM unit 851, a second NVM unit 852, a third NVM unit 853 and a fourth NVM unit 854.

In operation, the first or ROM memory 230 of FIG. 2 stores boot code for initializing registers and memories, and stores basic library functions for erasing and programming the second or Flash memory 240. The boot code in the first memory 230 is written by the manufacturer when the system 200 is manufactured. Here, the first memory, which is a mask ROM, cannot be erased or reprogrammed. The second memory 240 is an erasable and programmable NVM, generally flash memory, and initially empty.

The mode generator 250 includes the two NVMs 251 and 252 for storing modes that determine which memory out of the ROM 230 and the flash memory 240 is selected. In the present embodiment, the address range of the flash memory is 0x00000 through 0x4FFFF, the address range of the ROM is 0x80000 through 0x83FFF, and a boot address being the index address of the boot code is 0.

The boot address that the CPU 210 instructs is fixed when the system is manufactured. In this case, the CPU could try to read the boot code in the flash memory, but the flash memory is initially empty and needs to be initialized using the boot code of the ROM in advance of its use.

An exemplary operational flow, once the system is delivered to the customer, proceeds as follows:

1. External reset (EXT_RST) occurs by power up or reset pin.

2. The mode signals (BootMem, RomHidden) are read from the two NVMs 251 and 252 of the mode generator.

3. The mode signals are input to the decoder 220. Initially, BootMem is logic high and RomHidden is logic low. Here, the BootMem signal represents which memory address range includes the boot address. In this example, BootMem is already logic high when the system is manufactured because the boot address belongs to the range of the flash memory. The RomHidden signal of logic high prevents the CPU 210 from accessing the ROM. The manufacturer's code will not be involved in the system after writing the customer's specific code to the flash memory, for security.

4. The CPU 210 starts in response to an internal reset (INT_RST).

5. The CPU sends the boot address to the decoder 220.

6. The decoder determines to which memory the boot address is sent. The boot address is sent to the ROM 230 at the first booting even if the boot address belongs to the flash memory address range.

7. The CPU fetches an instruction stored in the ROM address corresponding to the boot address.

8. The CPU sends an address (addr1) corresponding to the instruction to the decoder.

9. The decoder sends the address (addr2) corresponding to the address (addr1) to the ROM.

10. The CPU starts the booting operation according to the routine the address (addr2) designates.

11. The booting operation is finished. This is a booting operation by the manufacturer's code. The registers and the memories including the ROM and the flash memory are initialized, and communication between the CPU and an external 10 is practicable.

12. The CPU writes the customer specific code stored in the external 10 to the flash memory 240.

13. Thereafter, the customer can modify the value of the two NVMs 251 and 252. When BootMem is changed to logic low, the system is booted by the customer's code stored in the flash memory instead of the code in the ROM. When RomHidden is changed to logic high, the CPU cannot access the ROM. This prevents the manufacturer's code from being involved in the system.

In response to the external reset, BootMem and RomHidden are set before the CPU 210 starts. Initially, BootMem is logic high and RomHidden is logic low. The CPU 210 outputs an address (addr1) and types of the address (e.g., boot address, instruction or data) to the decoder. When the type of the addr1 is boot address (BootAdd) and instruction (INST), the decoder activates ROM_SEL and inactivates FM_SEL.

The decoder sends the addr1 from the CPU to addr2 of the ROM 230. The system is booted using the boot code stored in the ROM, which holds the manufacturer's code. After initial booting and writing to the flash 240, the customer can change BootMem to logic low. Thus, the decoder inactivates ROM_SEL and activates FM_SEL. The decoder sends the addr1 from the CPU to addr2 of the flash memory 240. The system is booted using the boot code stored in the flash memory, which holds the customer's code.

The customer can change RomHidden to logic high. The decoder inactivates ROM_SEL until RomHidden becomes logic low. The system cannot access the ROM. This prevents the manufacturer's code from being involved in the system and can protect the system against a back door, for example, which a manufacturer may intentionally implant for easily maintaining the system program or other purposes.

The exemplary mode generator 350 of FIG. 5 is similar to the mode generator 250 of FIG. 2, but further includes two memories 353 and 354 for storing locking modes. The two memories 353 and 354 are only programmable NVMs, generally PROMs. Once programmed (e.g., logic high), the memories cannot be erased (e.g., logic low). The UserLock signal enables the system to boot using only the flash memory 340. This prevents the system from being booted using the ROM 330 by erroneous changes to BootMem. Here, the customer may still access the ROM 330 and copy library and programs to the flash memory.

The mode decoder 320 of FIG. 3 uses the UserLock and RomHiddenLock modes from the mode generator 350 to prevent write access to the NVMs that hold the BootMem and RomHidden modes, respectively.

The RomHiddenLock signal permanently prevents the CPU 310 from accessing the ROM. This prevents the system from accessing the ROM 330 by erroneous changes to RomHidden. Here, the customer cannot use the library and programs provided by manufacturer that are stored only in ROM.

The system 800 of FIG. 8 operates similarly to the system 300 of FIG. 5, but uses the mode generator 850 for interpreting the UserLock and RomHiddenLock modes to prevent write access to the NVMs that hold the BootMem and RomHidden modes, respectively.

Although illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A memory system comprising:
    a mode decoder;
    a first inerasable memory in signal communication with the mode decoder;
    a second erasable and programmable memory in signal communication with the mode decoder; and
    a mode generator in signal communication with the mode decoder, the mode generator comprising a plurality of non volatile memory units for storing modes at least one of which is indicative of selecting at least one of the first and second memories, and providing a signal indicative of selecting one of the first or second memories as a boot memory,
    wherein the mode generater generates a singal indicative of preventing access to the first memory.

2. The memory system of claim 1 wherein the first inerasable memory comprises a flash loader that is executable by a processor to program the second erasable and programmable memory.

3. The memory system of claim 1, at least one of the first and second memories comprising an internal address decoder.

4. A memory system comprising:
    a mode decoder;
    a first inerasable memory in signal communication with the mode decoder;
    a second erasable and programmable memory in signal communication with the mode decoder; and
    a mode generator in signal communication with the mode decoder, the mode generator comprising a plurality of non-volatile memory units for storing modes at least one of which is indicative of selecting at least one of the first and second memories, and providing a signal indicative of selecting one of the first or second memories as a boot memory;
    the mode generator further comprising at least one locking mode.

5. The memory system of claim 4, the at least one locking mode comprising a locking mode requiring the memory system to subsequently boot using only a currently selected memory.

6. The memory system of claim 4, the at least one locking mode comprising a locking mode for preventing the memory system from changing a mode indicative of preventing access to the first memory.

7. The memory system of claim 4 wherein the mode generator is responsive to a plurality of operational modes, one of the operational modes preventing the at least one locking mode from being unlocked.

8. The memory system of claim 7, the mode generator further comprising word line decoding circuitry responsive to a signal indicative of a lock mode, a signal indicative of a program instruction, and a signal indicative of an erase instruction for preventing changing of a mode other than a lock mode.

9. The memory system of claim 1 wherein the first memory is a Mask ROM and the second memory is a flash memory.

10. The memory system of claim 1 the first memory comprising boot code and library functions.

11. A memory system comprising:
    a mode decoder;
    a first inerasable memory in signal communication with the mode decoder;
    a second erasable and programmable memory in signal communication with the mode decoder; and
    a mode generator in signal communication with the mode decoder, the mode generator comprising a plurality of non-volatile memory units for storing modes at least one of which is indicative of selecting at least one of the first and second memories, and providing a signal indicative of selecting one of the first or second memories as a boot memory,
    wherein at least one of the plurality of non-volatile memory units is for storing a mode indicative of preventing access to the first memory.

12. The memory system of claim 11 wherein the mode indicative of selecting at least one of the first and second memories initially selects the first memory, and the mode indicative of preventing access to the first memory initially permits access to the first memory.

13. The memory system of claim 1 the mode decoder comprising:
    an instruction/data input for receiving an instruction/data signal; and
    an instruction/data decoding portion for selecting one of the first and second memories in response to the received instruction/data signal.

14. The memory system of claim 13, the mode decoder further comprising a boot address input for receiving a boot address signal indicative of whether a requested memory address is located within a boot address range, wherein the instruction/data decoding portion is responsive to the boot address signal.

15. The memory system of claim 14, the mode decoder further comprising at least one of an output for a signal indicative of selecting the first memory and an output for a signal indicative of selecting the second memory.

16. The memory system of claim 14, the mode decoder further comprising:
    an address input for receiving at least one bit of a requested memory address;
    an output for providing a signal indicative of selecting the first memory; and
    an output for providing a signal indicative of selecting the second memory,
    wherein the mode decoder is responsive to the received at least one bit of the requested memory address.

17. The memory system of claim 13, the mode decoder further comprising a boot memory input for receiving a signal indicative of a boot memory mode, wherein the instruction/data decoding portion is responsive to the boot memory mode.

18. A memory system comprising:
    a mode decoder;
    a first inerasable memory in signal communication with the mode decoder;
    a second erasable and programmable memory in signal communication with the mode decoder; and
    a mode generator in signal communication with the mode decoder, the mode generator comprising a plurality of non-volatile memory units for storing modes at least one of which is indicative of selecting at least one of the first and second memories, and providing a signal indicative of selecting one of the first or second memories as a boot memory, an instruction/data input for receiving an instruction/data signal, an instruction/data decoding portion for selecting one of the first and second memories in response to the received instruction/data signal, and a hidden mode input for receiving a signal indicative of a memory being hidden,
wherein the instruction/data decoding portion is responsive to the hidden mode.

19. A single chip microcontroller comprising the memory system of claim 1.

20. An embedded system comprising the memory system of claim 1.

21. The embedded system of claim 20, further comprising at least one processor in signal communication with the decoder for accessing memory addresses only in accordance with the mode generator.

22. The embedded system of claim 21 wherein the mode generator is responsive to a reset signal for stabilizing the mode generator before the processor reads a mode of the mode generator.

23. The memory system of claim 1, the mode generator comprising first and second non-volatile memory units, the first non-volatile memory unit for storing and providing a signal indicative of selecting one of the first or second memories as a boot memory, and the second non-volatile memory unit for storing and providing a signal indicative of preventing all access to the first memory.

24. A memory system comprising:
a mode decoder;
a first inerasable memory in signal communication with the mode decoder;
a second erasable and programmable memory in signal communication with the mode decoder; and
a mode generator in signal communication with the mode decoder, the mode generator comprising a plurality of non-volatile memory units for storing modes at least one of which is indicative of selecting at least one of the first and second memories, and providing a signal indicative of selecting one of the first or second memories as a boot memory,
the mode decoder comprising:
a first AND gate in signal communication with a processor;
a second AND gate in signal communication with the first AND gate and the mode generator;
an OR gate in signal communication with the second AND gate and the processor;
a third AND gate in signal communication with the OR gate and the mode generator for providing a signal indicative of selecting the first inerasable memory; and
a fourth AND gate in signal communication with second AND gate and the processor for providing a signal indicative of selecting the second erasable and programmable memory.

25. A memory system comprising:
a mode decoder;
a first inerasable memory in signal communication with the mode decoder;
a second erasable and programmable memory in signal communication with the mode decoder; and
a mode generator in signal communication with the mode decoder, the mode generator comprising a plurality of non-volatile memory units for storing modes at least one of which is indicative of selecting at least one of the first and second memories, and providing a signal indicative of selecting one of the first or second memories as a boot memory,
the mode decoder comprising:
a first AND gate in signal communication with at least one bit line of an address output from a processor;
a second AND gate in signal communication with the first AND gate and an instruction or data address type output from the processor;
a third AND gate in signal communication with the second AND gate and a boot memory selection signal from the mode generator;
a fourth AND gate in signal communication with the third AND gate and a ROM hidden signal from the mode generator for providing a signal indicative of enabling the first inerasable memory or the second erasable and programmable memory; and
a fifth AND gate in signal communication with fourth AND gate and the at least one bit line of the address output from the processor for providing a signal indicative of a translated address bit for the first or second memory.

26. A method for executing boot code of an embedded system, the method comprising:
initially booting the system from a first inerasable memory;
programming a second erasable and programmable memory for subsequent booting;
programming a mode generator with a plurality of modes at least one of which is indicative of selecting at least one of the first and second memories;
programming the mode generator to subseguently boot the system from the second memory;
programming the mode generator for at least one of locking the system into booting from the second memory, subseguently preventing access to the first memory, or locking the system into preventing chances to a mode indicative of allowing or preventing all access to the first memory;
subsequently booting the system from the second memory;
programming the mode generator to subsequently prevent all access to the first memory; and
subsequently preventing all access to the first memory.

27. A method for executing boot code of an embedded system, the method comprising:
initially booting the system from a first inerasable memory;
programming a second erasable and programmable memory for subsequent booting;
programming a mode generator with a plurality of modes at least one of which is indicative of selecting at least one of the first and second memories;
programming the mode generator to subseguently boot the system from the second memory;
programming the mode generator for at least one of locking the system into booting from the second memory, subseguently preventing access to the first memory, or locking the system into preventing changes to a mode indicative of allowing or preventing all access to the first memory;
subsequently booting the system from the second memory; and
decoding an input address in accordance with a mode by:
first ANDing at least one bit line of an address output from a processor;
second ANDing the first ANDed result with an instruction or data address type output from the processor;
third ANDing the second ANDed result with a boot memory selection signal from the mode generator;
fourth ANDing the third ANDed result with a ROM hidden signal from the mode generator and providing a signal indicative of enabling the first inerasable memory or the second erasable and programmable memory; and
fifth ANDing the fourth ANDed result with the at least one bit line of the address output from the processor for providing a signal indicative of a translated address bit for the first or second memory.

28. A method for executing boot code of an embedded system, the method comprising:
initially booting the system from a first inerasable memory;
programming a second erasable and programmable memory for subsequent booting;
programming a mode generator with a plurality of modes at least one of which is indicative of selecting at least one of the first and second memories;
programming the mode generator to subsequently boot the system from the second memory;
subsequently booting the system from the second memory; and
programming the mode generator to lock the system into booting from the second memory.

29. A method for executing boot code of an embedded system, the method comprising:
initially booting the system from a first inerasable memory;
programming a second erasable and programmable memory for subsequent booting;
programming a mode generator with a plurality of modes at least one of which is indicative of selecting at least one of the first and second memories;
programming the mode generator to subsequently boot the system from the second memory;
subsequently booting the system from the second memory; and
programming the mode generator to subsequently prevent access to the first memory.

30. A method for executing boot code of an embedded system, the method comprising:
initially booting the system from a first inerasable memory;
programming a second erasable and programmable memory for subsequent booting;
programming a mode generator with a plurality of modes at least one of which is indicative of selecting at least one of the first and second memories;
programming the mode generator to subsequently boot the system from the second memory;
subsequently booting the system from the second memory; and
programming the mode generator to lock the system into preventing changes to a mode indicative of allowing or preventing all access to the first memory.

31. The method of claim 30, further comprising:
stabilizing the mode generator;
reading a mode of the mode generator; and
accessing memory addresses only in accordance with the mode generator.

32. The method of claim 30 wherein the mode generator locks the system to secure it against any software back door or built in utility that might otherwise be implemented in the first memory.

33. The method of claim 30, further comprising:
programming the mode generator to subsequently boot the system from the first memory;
reprogramming the second memory for subsequent booting;
programming the mode generator to subsequently boot the system from the reprogrammed second memory; and
subsequently booting the system from the reprogrammed second memory.

34. The method of claim 30, further comprising:
reprogramming the mode generator to subsequently reboot the system from the first memory; and
subsequently rebooting the system from the first memory.

* * * * *